United States Patent [19]
Wohlfeld

[11] Patent Number: 5,372,548
[45] Date of Patent: Dec. 13, 1994

[54] LONGITUDINAL AND ROTARY SHOCK ABSORBER FOR ROTARY AND PERCUSSION DRILL BITS

[76] Inventor: William I. Wohlfeld, 2208 Gulf, Midland, Tex. 79705

[21] Appl. No.: 781,738

[22] Filed: Oct. 23, 1991

Related U.S. Application Data

[63] Continuation of Ser. No. 498,348, Mar. 23, 1990, abandoned.

[51] Int. Cl.$^5$ ............................................. F16D 3/68
[52] U.S. Cl. ........................................ 464/20; 464/76; 464/83
[58] Field of Search .................. 464/20, 18, 76, 83, 464/85, 91, 96, 87, 74, 73, 180

[56] References Cited

U.S. PATENT DOCUMENTS

| | | | |
|---|---|---|---|
| 1,671,436 | 5/1928 | Melott | 464/76 |
| 3,183,684 | 5/1965 | Zeidler | 464/91 |
| 3,746,330 | 7/1973 | Taciuk | 464/95 X |
| 3,779,040 | 12/1973 | Garrett | 464/20 |
| 4,139,994 | 2/1979 | Alther | 464/169 X |
| 4,571,215 | 2/1986 | Hansen | 464/180 |
| 4,627,885 | 12/1986 | Arlt | 464/76 X |

*Primary Examiner*—Daniel P. Stodola
*Attorney, Agent, or Firm*—Neal J. Mosely

[57] ABSTRACT

A longitudinal and rotary vibration dampener or shock absorber for rotary and percussion drill bits comprises a resilient element to absorb axial compression loads, preferably in a compression mode; a resilient element to absorb axial tension loads, preferably in a compression mode; resilient elements to absorb torque loads in clockwise and counterclockwise directions preferably in a compression mode; radial guide surfaces for long wear between the driver and the driven members and preferably spaced apart axially to resist bending couple loads applied across the two members during operation; and a seal and surface to allow passage of air or other fluid through the unit during operation. All resilient elements, guide members, and seals are readily replaceable in the field. The unit is structurally sound and enclosed and is attachable to the drilling rig drive head and drill pipe or to the drill pipe and bit as the case may be. A preferred embodiment has a drive shaft and a driven shaft interconnected by separate longitudinal and torque load absorbing members, one shaft having internal drive plates or splines fitting inside cavities on the other and separate elastomeric shock absorbing members absorbing rotary torque and extension shock loads. An elastomeric shock absorbing member positioned in a cavity between the shafts absorbs longitudinal compressive shock loads.

9 Claims, 4 Drawing Sheets

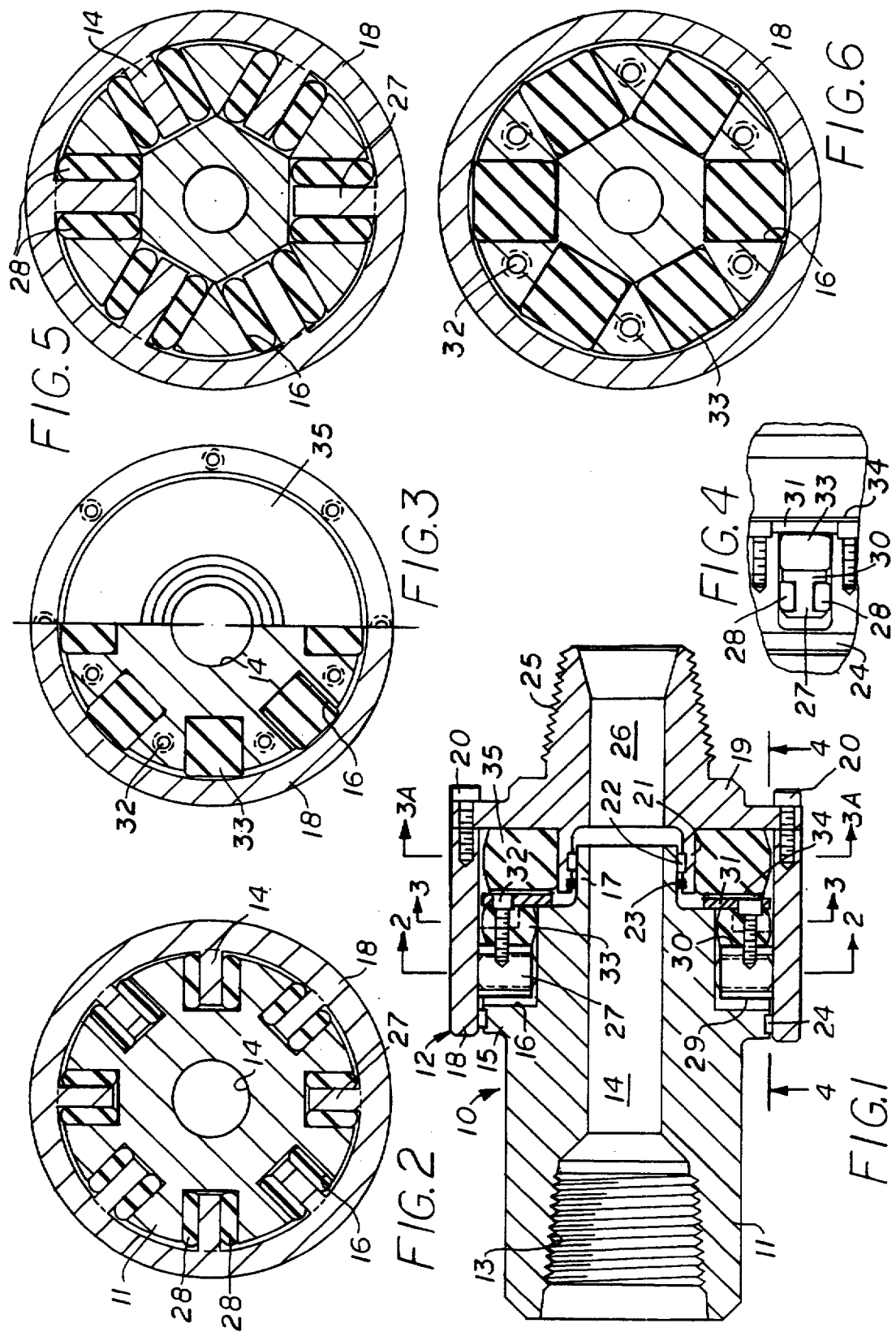

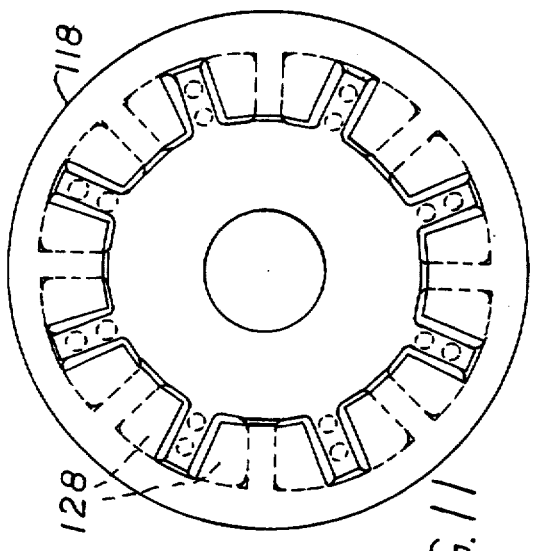
FIG.11
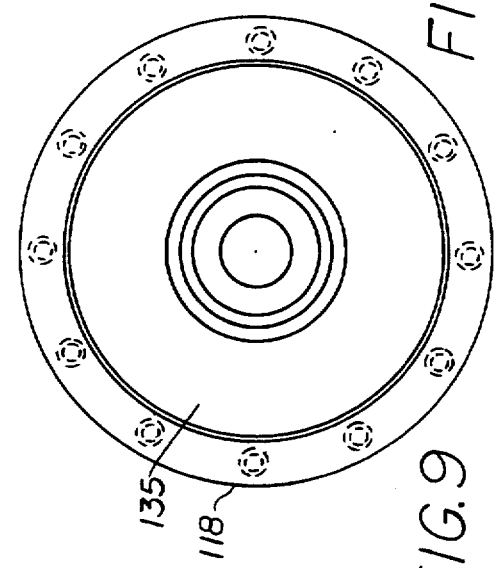
FIG.9
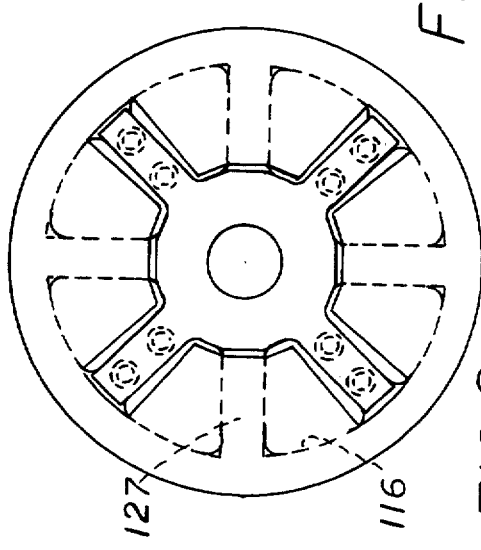
FIG.8
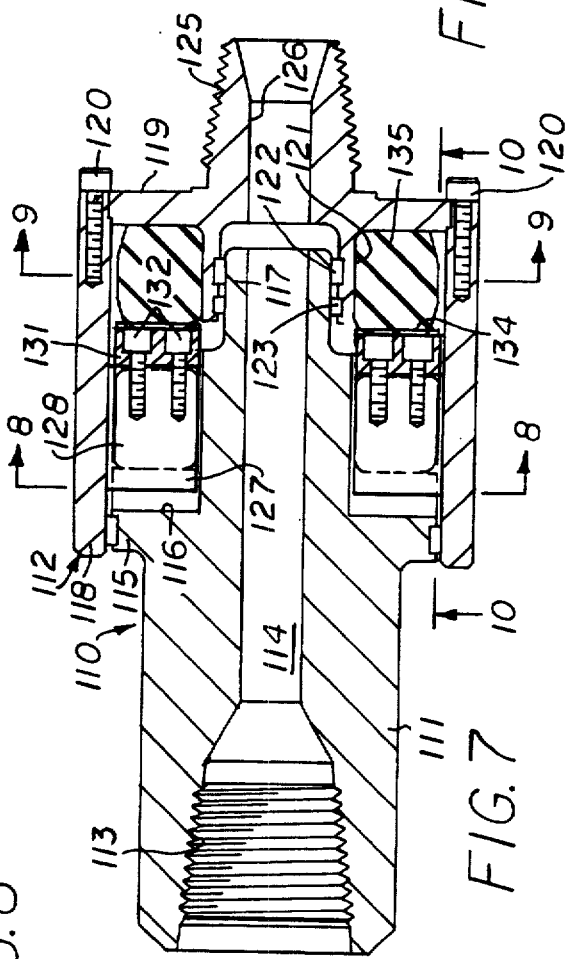
FIG.12
FIG.7

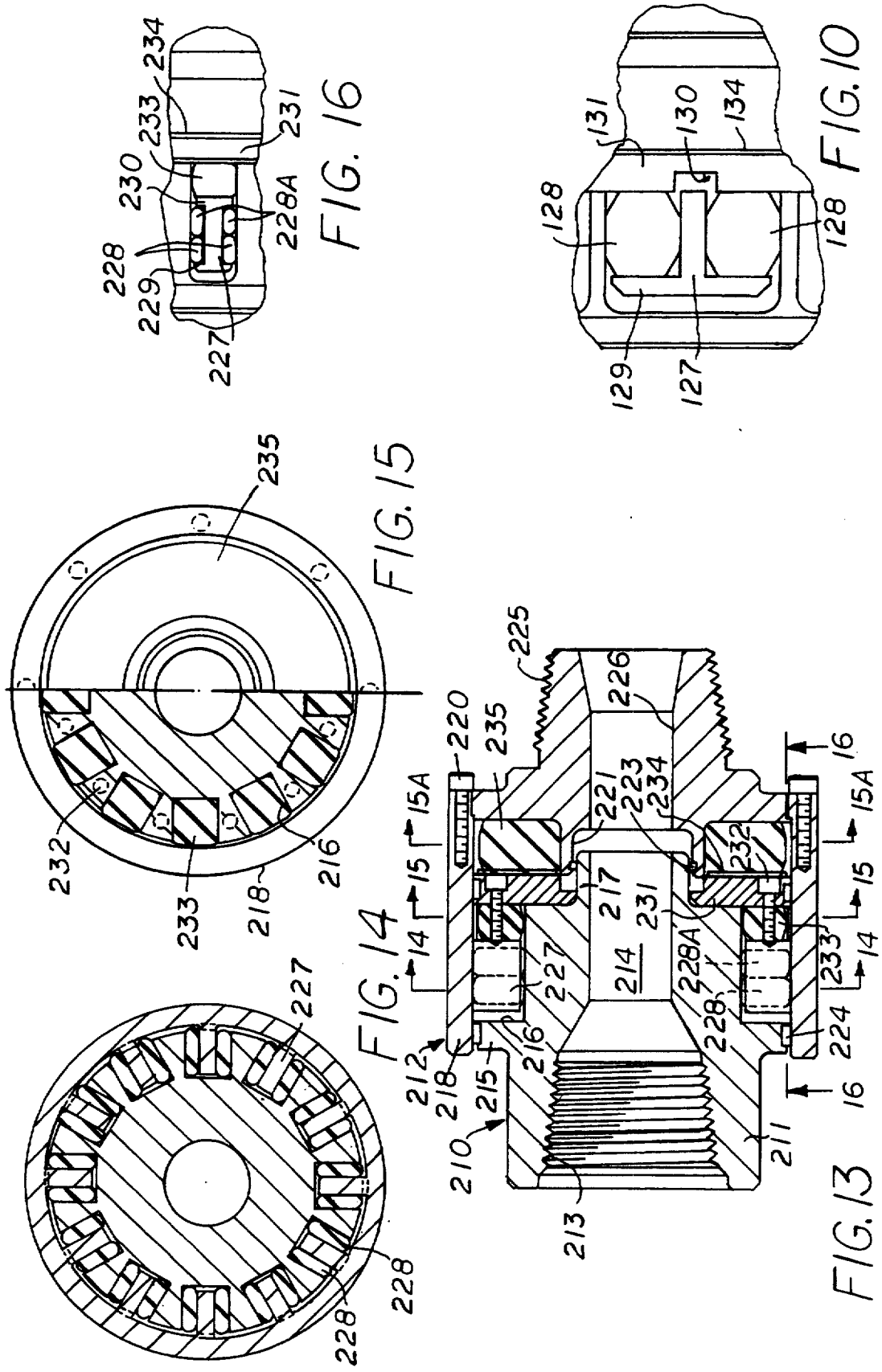

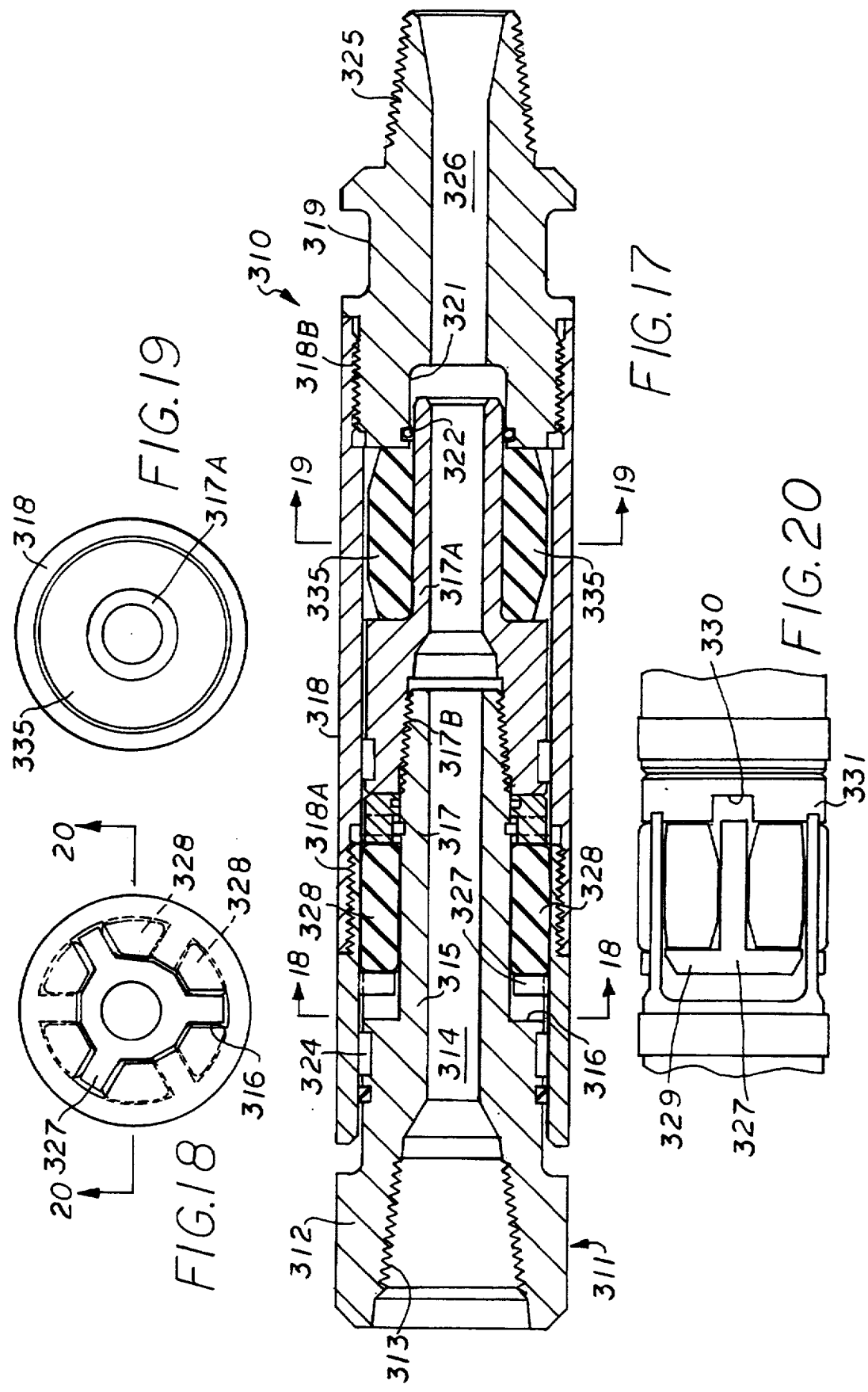

LONGITUDINAL AND ROTARY SHOCK ABSORBER FOR ROTARY AND PERCUSSION DRILL BITS

CROSS REFERENCED TO RELATED APPLICATION

This application is a continuation of application Ser. No. 07/498,348 filed Mar. 23, 1990, now abandoned.

FIELD OF THE INVENTION

This invention relates generally to a vibration dampener or shock absorber for drill bits and more particularly to a new and improved longitudinal and rotary vibration dampener or shock absorber for rotary and percussion drill bits.

BACKGROUND OF THE INVENTION

Vibration dampeners or shock absorbers for drilling applications are well known in the art. However, vibration dampener or shock absorbers for both longitudinal and rotary shock loads have been characterized by short operating lives.

Work U.S. Pat. No. 4,109,488 discloses a shock absorbing rotary drive coupling having a drive shaft and a driven shaft with an annular rubber torque transmitting member.

Garrett U.S. Pat. No. 3,779,040 discloses a vibration dampener having a drive shaft and a driven shaft with a plurality of rubber torque transmitting members sandwiched between steel drive plates on the respective members. This product is available commercially as the Smith "SWIVEL MOUNT SHOCK SUB".

Hughes U.S. Pat. Nos. 3,257,827 and 3,306,078 disclose rotary drilling shock absorbers having a drive shaft and a driven shaft with a plurality of rubber torque transmitting members sandwiched between steel drive plates on the respective members.

Vertson U.S. Pat. No. 3,323,326 discloses a well drilling shock absorber having a drive shaft and a driven shaft with helical ribs and splines therein and rubber torque transmitting members therebetween.

Taciuk U.S. Pat. No. 3,746,330 discloses a drill stem shock absorber having a drive shaft and a driven shaft with a plurality of rubber torque transmitting members sandwiched between annular steel drive plates on the respective members.

Neimark U.S. Pat. No. 3,947,009 discloses a drill stem shock absorber having a drive shaft and a driven shaft with a plurality of rubber torque transmitting members sandwiched between annular steel drive plates on the respective members, the plates being secured together by metal pins and bolts.

Alther U.S. Pat. No. 4,139,994 discloses a vibration isolator having a drive shaft and a driven shaft with torque transmitting splines having elastic material sandwiched therebetween and separate longitudinal load absorbing members tapered to give a predetermined load displacement curve and preloaded in an amount equal to the expected set in the members.

Hansen U.S. Pat. No. 4,571,215 discloses a vibration dampener apparatus having a drive shaft and a driven shaft with torque transmitting splines having elastic material sandwiched therebetween and a separate longitudinal load absorbing member.

This invention is distinguished from the prior art by providing a longitudinal and rotary shock absorber for rotary and percussion drill bits comprising a drive shaft and a driven shaft interconnected by separated longitudinal and torque load absorbing members. One of the shafts has internal drive plates or splines which fit inside cavities on the other shaft and rubber shock absorbing members absorbing rotary torque and extension shock loads. An annular rubber shock absorbing member is positioned in a cavity between the shafts to absorb longitudinal compression shock loads. The isolation of the torque shock absorbing function from the longitudinal shock absorbing function improves the life of the tool considerably.

SUMMARY OF THE INVENTION

It is therefore a general object of this invention to provide a new and improved vibration dampener or shock absorber for rotary and percussion drilling.

It is another object of the present invention to provide a new and improved vibration dampener or shock absorber for rotary and percussion drilling, especially for top drive drilling.

It is another object of this invention to provide a new and improved vibration dampener or shock absorber for rotary and percussion drilling which isolates the longitudinal and rotary shock absorption.

It is another object of this invention to provide a new and improved vibration dampener or shock absorber for rotary and percussion drilling which isolates the compression and extension shock absorption.

It is still another object of this invention to provide a new and improved vibration dampener or shock absorber for rotary and percussion drilling which isolates the longitudinal and rotary shock absorption and further isolates the compression and extension shock absorption.

It is still another object of this invention to provide a new and improved vibration dampener or shock absorber for rotary and percussion drilling having separate shock absorbing elements which isolate the longitudinal and rotary shock absorption.

It is still another object of this invention to provide a new and improved vibration dampener or shock absorber for rotary and percussion drilling having separate shock absorbing elements which isolate the compression and extension shock absorption.

It is yet another object of this invention to provide a new and improved vibration dampener or shock absorber for rotary and percussion drilling having separate shock absorbing elements which isolate the longitudinal and rotary shock absorption and one such element further isolates the compression and extension shock absorption.

It is a further object of this invention to provide a new and improved vibration dampener or shock absorber for rotary and percussion drilling which is simple and inexpensive to build and maintain and which has long operating life.

Other objects of the invention will become apparent from time to time throughout the specification and claims as hereinafter related.

The above noted and other objects of the invention are accomplished by a longitudinal and rotary vibration dampener or shock absorber for rotary and percussion drill bits which comprises a resilient element to absorb axial compression loads, preferably in a compression mode; a resilient element to absorb axial tension loads, preferably in a compression mode; resilient elements to absorb torque loads in clockwise and counterclockwise directions preferably in a compression mode; radial guide surfaces for long wear between the driver and the driven members and preferably spaced apart axially to resist bending couple loads applied across the two members during operation; and a sealing means and surface to allow passage of air or other fluid through the unit during operation. All resilient elements, guide members, and seals are readily replaceable in the field. The unit is structurally sound and enclosed and is attachable to the drilling rig drive head and drill pipe or to the drill pipe and bit as the case may be. A preferred embodiment has a drive shaft and a driven shaft interconnected by separate longitudinal and torque load absorbing members, one shaft having internal drive plates or splines fitting inside cavities on the other and separate elastomeric shock absorbing members absorbing rotary torque and extension shock loads. An elastomeric shock absorbing member positioned in a cavity between the shafts absorbs longitudinal compressive shock loads. The isolation of the torque shock absorbing function from the longitudinal shock absorbing function improves the tool life.

BRIEF DESCRIPTION OF THE DRAWINGS

FIG. 1 is an axial or longitudinal sectional view of a preferred embodiment of a new and improved longitudinal and rotary vibration dampener or shock absorber for rotary and percussion drill bits.

FIG. 2 is a sectional view on the section line 2—2 of the embodiment shown in FIG. 1.

FIG. 3 is a split sectional view on the section lines 3—3 and 3a—3a of the embodiment shown in FIG. 1.

FIG. 4 is a sectional view on the section line 4—4 of the embodiment shown in FIG. 1.

FIG. 5 is a sectional view on the section line 2—2 of an alternate embodiment to that shown in FIG. 1 having a different number of rotational shock absorber pads.

FIG. 6 is a sectional view on the section line 3—3 of an alternate embodiment to that shown in FIG. 1 having a different number of rotational shock absorber pads.

FIG. 7 is an axial or longitudinal sectional view of another preferred embodiment of a new and improved longitudinal and rotary shock absorber for rotary and percussion drill bits having only a single set of rotary shock absorption pads.

FIG. 8 is a sectional view on the section line 8—8 of the embodiment shown in FIG. 7.

FIG. 9 is a sectional view on the section line 9—9 of the embodiment shown in FIG. 7.

FIG. 10 is a sectional view on the section line 2—2 of the embodiment shown in FIG. 1.

FIG. 11 is a sectional view on the section line 8—8 of an alternate embodiment to that shown in FIG. 7 having a different number of rotational shock absorber pads.

FIG. 12 is a sectional view on the section line 8—8 of an alternate embodiment to that shown in FIG. 7 having a different number of rotational shock absorber pads.

FIG. 13 is an axial or longitudinal sectional view of another preferred embodiment of a new and improved longitudinal and rotary shock absorber for rotary and percussion drill bits having only a double set of rotary shock absorption pads.

FIG. 14 is a sectional view on the section line 14—14 of the embodiment shown in FIG. 13.

FIG. 15 is a split sectional view on the section lines 15—15 and 15a1—15a of the embodiment shown in FIG. 13.

FIG. 16 is a sectional view on the section line 16—16 of the embodiment shown in FIG. 13.

FIG. 17 is an axial or longitudinal sectional view of another preferred embodiment of a new and improved longitudinal and rotary shock absorber for percussion drill bits having only a single set of rotary shock absorption pads and longitudinally spaced longitudinal or axial shock absorption pads.

FIG. 18 is a sectional view on the section line 18—18 of the embodiment shown in FIG. 17.

FIG. 19 is a sectional view on the section line 19—19 of the embodiment shown in FIG. 17.

FIG. 20 is a sectional view on the section line 20—20 of FIG. 18.

THEORY OF SHOCK ABSORBER DESIGN

Vibration dampeners or shock absorbers for drilling applications are well known in the art. However, vibration dampeners or shock absorbers for both longitudinal and rotary shock loads have been characterized by short operating lives and bulky design. The prime reason for these problems is a failure to understand the nature of the drilling loads applied to the dampeners. These loads are the result of the applied and reflected drilling loads from the bit.

The most common bit types used in drilling are the blade type or other similar drag bits, the roller cone bits, and the rotary percussion hammer operated bits. At any selected time, any of the several types of bits may be used on the same drilling rig. Therefore, it is critical to the design of a vibration dampener or shock absorber that the particular bit operational characteristics be understood.

The common requirement in the use of each of these bits is the need for application of weight to the bit to produce a cutting action. This application of weight in turn produces a torque requirement to rotate the bit to cause the continuous cutting action to be generated to cause the bit to advance into the earth. Of course, a fluid must be passed down through the bit to bring the cuttings out of the hole. An understanding of the relationship between the weight required and the resultant torque for drilling for each type bit is necessary to be able to design an effective vibration dampener or shock absorber.

A torque is a tangential force acting at a distance from the center about which the force is made to rotate. The tangential force in the case of a drill bit is a function of the downforce for drilling. For purposes of illustration, the following arbitrary and empirical relationships can be used. For a drag bit, the tangential force is approximately $\frac{1}{8}$ to $\frac{1}{4}$ of the downforce; for a roller cone bit, the tangential force is 1/20 to 1/10 of the downforce; for a percussion hammer bit, the tangential force is 1/10 of the downforce.

In relating these numbers to practice, consider the case of a typical top drive rig for drilling a 6¾ inch diameter hole. Such a rig typically will be able to exert a downforce onto the drill pipe of 40,000 lb., a hoisting force of 30,000 lb., and a torque of 4,000 ft.lb.. The drill pipe used typically might be 4½ inch O. D. X 25-30 foot in length and weigh approximately 17 lb./ft. So equipped, the maximum drilling depth will be about 1500 feet with only the drill pipe as the major parasite weight in the hole. This depth is a function of hoisting capacity.

A drag bit is generally used to drill softer or unconsolidated material. Weight on the bit will generally be restricted to 20,000 lb. for the 6¾ hole size. At this weight, the torque on the bit will be 1,800 ft.lb. If 20,000 lb. of weight is required on the bit, downforce will have to be applied from the rig in continually decreasing amounts to a depth of 1,175 feet, at which depth the weight of the drill pipe will equal 20,000 lb.. From this point to 1,500 feet, weight will have to be held back by the rig to not exceed the 20,000 lb. limit on the bit. From 1,175 feet to 1,500 feet, the hold back force will increase from zero to 5,525 lb. at 1,500 feet. With these drag bit conditions, a vibration dampener mounted to the drive head will see axial loads, steady state, of 20,000 lb. compression initially, decreasing to zero at 1,175 feet, and then extending to 5,525 lb. in tension at 1,500 feet, while simultaneously absorbing a steady state torque of 1,800 ft. lb.. When the bit is retracted from 1,500 feet with no rotation, the axial load will be a tension load of 30,000 lb. at 1,500 feet to zero when all the pipe is out of the hole. This load is a fairly steady state load not subject to a vibratory load.

A roller cone bit is generally used to drill soft to very hard rock. Bit loads will generally range from 20,000 to 40,000 lb. for the 6¾ hole size. The same analoy as above for the drag bit applies to the roller bit with one important exception. The torque to rotate the roller bit with a downforce of 20,000 to 40,000 lb., will be a maximum of 500 to 1,100 ft. lb. compared to the drag bit torque of 1,800 ft. lb. at 20,000 lb. axial load. With 20,000 lb. on the bit, the axial loads will be as above for the drag bit. With 40,000 lb. on the roller bit, the axial load on the dampener or shock absorber will be a compression load to the 1,500 foot total depth. If the entire drill string weight of 25,500 lb. at 1,500 ft. is used for bit weight, an additional load of 14,500 lb. will need to be applied through the dampener or shock absorber to reach the 40,000 lb. required. With these conditions, the dampener or shock absorber mounted to the drive head will see axial loads of 40,000 lb. compression initially, decreasing to 14,500 lb. at 1,500 feet, while absorbing a torque of 1,100 ft. lb.

A percussion hammer bit is used with a percussion hammer to drill the hardest rocks. The weight applied to the bit results principally from the impact loads applied from airdriven reciprocating hammer piston. There is a small compression pre-load required initially to cause the hammer to operate. For a 5⅜ inch O. D. hammer used to drill a 6¾ diameter hole, the preload will not exceed 6,000 lb. at 200 p.s.i. air pressure to operate the hammer. This load requirement is constant while the hammer is operating. The resulting torque load will be in the range of 150–300 ft. lb.. The downforce from the rig then will be 6,000 lb. decreasing to zero at 350 feet. From this point to 1,500 feet will require tension hold-back increasing from zero at 350 feet to 13,500 lb. at 1,500 feet.

In each case above, the loads discussed are assumed to be steady state loads. In operation, vibratory loads are reflected back from the bit to the drill pipe and then to the rig drive head. It is for this reason that a vibration dampener is needed. The frequency range of the vibrations can be from 200 Hz/minute from a roller bit to 1,500 Hz/minute for a hammer and bit combination. The amplitude of the vibrations can range from 1/16 inch to 1 inch depending upon the rock type and other drilling conditions.

The above method of evaluation can be used to design dampeners or shock absorbers for the larger top drive rigs. On a small top drive rig with insufficient axial rotary travel to allow insertion of a dampener or shock absorber between the drive head and drill pipe, the dampener or shock absorber can be adapted to allow insertion of the unit into the drill string above the bit to isolate drilling vibrations. This unit will operate primarily in compression since all bit weight will pass through the unit to the bit. The extension loads will be limited to rebound loads and the static load to hoist the bit or hammer and bit out of the hole. In the case of a unit used above a percussion hammer, the rebound loads are a major load source to the dampener.

On a rig for deep or large diameter drilling where heavy drilling weights are required, drill collars or heavy weighted tubular members are run above the bit and are used to apply the weight to the bit. In this application, a dampener or shock absorber run immediately above the bit is required. Such a dampener or shock absorber is the same in design as the unit mentioned above except that it is much larger in capacity. In both cases, the primary loads become the axial compression loads and the torque loads. The axial extension element remains essential to the tool, however.

The point of the above illustration is to demonstrate that an effective vibration dampener or shock absorber for a top drive rig and all other type rigs must encompass certain features to be effective for the job and offer a long life.

These features must provide 1) a resilient element to absorb axial compression loads, preferably in a compression mode; 2) a resilient element to absorb axial tension loads, preferably in a compression mode; 3) resilient elements to absorb torque loads in clockwise and counterclockwise directions preferably in a compression mode; 4) radial guide surfaces for long wear between the driver and the driven members and preferably spaced apart axially to resist bending couple loads applied across the two members during operation; 5) a sealing means and surface to allow passage of air on other fluid through the unit during operation; 6) all resilient elements, guide members, and seals readily replaceable in the field; 7) a structurally sound and enclosed unit; and 8) attachment means to the rig drive head and drill pipe or to the drill pipe and bit as the case may be.

The present invention as conceived and illustrated is the only design so far presented that meets the above requirements. Likewise, this design is not limited in scope to application as presented. It may be adapted for use inside the large drilling heads used on such specialized machines as raise drills and road headers. In effect, it is a resilient coupling suitable for joining two shafts of any machine requiring resilience in compression, extension and torsion.

DESCRIPTION OF ONE PREFERRED EMBODIMENT

Referring to the drawings by numerals of reference, and more particularly to FIGS. 1-4, there is shown a longitudinal and rotary vibration dampener or shock absorber 10 comprising a main shaft 11 and housing 12. Shaft 11 has a lower end with a box thread opening 13 which opens into a longitudinal passage 14. Shaft 11 has an enlarged portion 15 with a plurality of circumferentially-spaced, longitudinally extending grooves 16 positioned inside housing 12 for limited rotational movement therein and a tubular extension 17.

The housing 12 comprises a tubular shell 18 with an end cap member 19 secured thereon by cap screws 20.

End cap member 19 has a tubular extension 21 which fits over shaft tubular extension 17 over upper guide bushing 22 and seal ring 23. Tubular shell 18 fits over shaft enlarged portion 15 and lower guide bushing 24. End cap member 19 has an upper extension comprising threaded pin 25 having a longitudinal passage 26 aligned with and opening from shaft longitudinal passage 14. Tubular shell 18 has circumferentially spaced inwardly-projecting plates or ribs 27 fitting into grooves 16 in shaft 11.

Ribs 27 are shown from a front view (section line 4—4) in FIG. 4 and form two cavities within grooves 16 in which there are positioned rubber (or other elastomeric material) torque elements 28 for absorbing rotational shock loads. Ribs 27 have end walls 29 and 30 which further enclose torque elements 28. An annular plate cap member 31 is secured on the end of shaft 11 by cap screws 32. Cap member 31 defines a space with end wall 30 in which extension shock elements 33 are positioned. A thin, annular, sheet-metal plate 34 is positioned against cap member 31 covering the recessed heads of cap screws 32. An annular cavity is defined end cap member 19 and annular plate 34 and is filled by an annular rubber compression element 35 which protects against longitudinal compression shock loads.

In use, the shock absorber 10 is connected by lower, box thread 13 to the drill pipe (not shown). The upper, pin thread 25 is connected to the drive mechanism (not shown) of the drilling apparatus. The drill bit (not shown), at the lower end of the pipe may be a rotary drill bit or a percussion-hammer-operated drill bit. In either case, the weight of the drill string applies a vertical, longitudinal load, as does the vertical force applied by the drilling mechanism. Torque loads are applied by rotation of the drill pipe and bit. In the course of drilling, the drill pipe and bit are subjected occasionally to rotational shocks and occasionally to vertical shocks both ill extension and in compression.

Rotational or torque shocks are absorbed by torque elements 28 which absorb forces in torque from either direction. Shock elements 33 absorb shock in extension of the tool by resisting downward extension of shaft 11. Shock element 35 absorbs compression shocks by resisting movement of housing 12 downward relative to shaft 11. Guide bushings 22 and 24 guide the tool components and resist bending movements, thus preventing knuckle-type wear. This tool therefore absorbs longitudinal, vertical shocks both in extension and compression, and rotary shocks from torque in either direction.

FIGS. 5 and 6 show a tool having six cavities (instead of eight, as in FIG. 2) but is otherwise constructed and functioning the same as the embodiment of FIGS. 1–4.

DESCRIPTION OF ANOTHER PREFERRED EMBODIMENT

Referring to the drawings by numerals of reference, and more particularly to FIGS. 7–10, there is shown a longitudinal and rotary shock absorber modified to use the torque members to absorb both rotational and extension shock loads.

Shock absorber 110 comprises a main shaft 111 and housing 112. Shaft 111 has a lower end with a box thread opening 113 which opens into a longitudinal passage 114. Shaft 111 has an enlarged portion 115 with a plurality of circumferentially-spaced, longitudinally extending grooves 116 positioned inside housing 112 for limited rotational movement therein and a tubular extension 117.

The housing 112 comprises a tubular shell 118 with an end cap member 119 secured thereon by cap screws 120. End cap member 119 has a tubular extension 121 which fits over shaft tubular extension 117 over upper guide bushing 122 and seal ring 123. Tubular shell 118 fits over shaft enlarged portion 115 and lower guide bushing 124. End cap member 119 has an upper extension comprising threaded pin 125 having a longitudinal passage 126 aligned with and opening from shaft longitudinal passage 114. Tubular shell 118 has circumferentially spaced inwardly-projecting plates or ribs 127 fitting into grooves 116 in shaft 111.

Ribs 127 are shown from a front view (section line 10—10 ) in FIG. 101 and form two cavities within grooves 116 in which there are positioned rubber (or other elastomeric material) shock elements 128 for absorbing rotational and extension shock loads. Ribs 127 have an end wall 129 and shaft 111 has grooves 130. An annular plate cap member 131 is secured on the end of shaft 11t by cap screws 132. A thin, annular, sheet-metal plate 134 is positioned against cap member 131 covering the recessed heads of cap screws 132. An annular cavity is defined end cap member 119 and annular plate 134 and is filled by an annular rubber compression element 135 which protects against longitudinal compression shock loads.

In use, the shock absorber 110 is connected by lower, box thread 113 to the drill pipe (not shown). The upper, pin thread 125 is connected to the drive mechanism (not shown) of the drilling apparatus. The. drill bit (not shown), at the lower end of the pipe may be a rotary drill bit or a percussion-hammer-operated drill bit. In either case, the weight of the drill string applies a vertical, longitudinal load, as does the vertical force applied by the drilling mechanism. Torque loads are applied by rotation of the drill pipe and bit. In the course of drilling, the drill pipe and bit are subjected occasionally to rotational shocks and occasionally to vertical shocks both in extension and in compression.

Rotational or torque shocks are absorbed by shock elements 128 which absorb forces .in torque from either direction and absorb shock in extension of the tool by resisting downward extension of shaft 111 by reason of movement of ribs 127 into grooves 130 compressing the shock elements 128. Shock element 135 absorbs compression shocks by resisting movement of housing 112 downward relative to shaft 111. Guide bushings 122 and 124 guide the tool components and resist bending moments, thus preventing knuckle-type wear. This tool therefore absorbs longitudinal, vertical shocks both in extension and compression, and rotary shocks from torque in either direction.

FIGS. 11 and 12 show a tool having eight or six cavities (instead of four, as in FIG. 8) but is otherwise constructed and functioning the same as the embodiment of FIGS. 7–10.

DESCRIPTION OF A FURTHER PREFERRED EMBODIMENT

Referring to the drawings by numerals of reference, and more particularly to FIGS. 13–16, there is shown a longitudinal and rotary shock absorber modified to use two sets of torque members to absorb rotational shock loads.

Shock absorber 210 comprises a main shaft 211 and housing 212. Shaft 211 has a lower end with a box thread opening 213 which opens into a longitudinal passage 214. Shaft 211 has an enlarged portion 215 with a plurality of circumferentially-spaced, longitudinally extending grooves 216 positioned inside housing 212 for limited rotational movement therein and a tubular extension 217.

The housing 212 comprises a tubular shell 218 with an end cap member 219 secured thereon by cap screws 220. End cap member 219 has a tubular extension 221 which fits over shaft tubular extension 217 over upper guide bushing 222 and seal ring 223. Tubular shell 218 fits over shaft enlarged portion 215 and lower guide bushing 224. End cap member 219 has an upper extension comprising threaded pin 225 having a longitudinal passage 226 aligned with and opening from shaft longitudinal passage 214. Tubular shell 218 has circumferentially spaced inwardly-projecting plates or ribs 227 fitting into grooves 216 in shaft 211.

Ribs 227 are shown from a front view (section line 16—16) in FIG. 16 and form two cavities within grooves 216 in which there are positioned rubber (or other elastomeric material) shock elements 228 and 228a for absorbing rotational shock loads. Ribs 227 have end walls 229 and 230 which further enclose torque elements 228. An annular plate cap member 231 is secured on the end of shaft 211 by cap screws 232. Cap member 231 defines a space with end wall 230 in which extension shock elements 233 are positioned. A thin, annular, sheet-metal plate 234 is positioned against cap member 231 covering the recessed heads of cap screws 232. An annular cavity is defined by end cap member 219 and annular plate 234 and is filled by an annular rubber compression element 235 which protects against longitudinal compression shock loads.

In use, the shock absorber 210 is connected by lower, box thread 213 to the drill pipe (not shown). The upper, pin thread 225 is connected to the drive mechanism (not shown) of the drilling apparatus. Guide bushings 222 and 224 guides the tool components and resist bending moments, thus preventing knuckle-type wear. The drill bit (not shown), at the lower end of the pipe may be a rotary drill bit or a percussion-hammer-operated drill bit. In either case, the weight of the drill string applies a vertical, longitudinal load, as does the vertical force applied by the drilling mechanism. Torque loads are applied by rotation of the drill pipe and bit. In the course of drilling, the drill pipe and bit are subjected occasionally to rotational shocks and occasionally to vertical shocks both in extension and in compression.

Rotational or torque shocks are absorbed by shock elements 228 and 228a which absorb forces in torque from either direction. Shock elements 233 absorb shock in extension of the tool by resisting downward extension of shaft 211. Shock element 235 absorbs compression shocks by resisting movement of housing 212 downward relative to shaft 211. This tool therefore absorbs longitudinal, vertical shocks both in extension and compression, and rotary shocks from torque in either direction.

DESCRIPTION OF A FURTHER PREFERRED EMBODIMENT

Referring to the drawings by numerals of reference, and more particularly to FIGS. 17–20, there is shown a Longitudinal and rotary shock absorber modified to use the torque members to absorb both rotational and extension shock loads, for specific application with percussion hammers used in blast hole drilling.

Shock absorber 310 comprises a main shaft 311 and housing 312. Shaft 311 has an upper end with a box thread opening 313 which opens into a longitudinal passage 314. Shaft 311 has a reduced portion 315 with a plurality of circumferentially-spaced, longitudinally extending grooves 316 positioned inside housing 312 for limited rotational movement therein and a tubular extension 317 threadedly connected at 317b to tubular extension or main shaft top sub 317a.

The housing 312 comprises an elongated tubular shell 318 with threaded connection 318a. An end sub 319 is secured thereon by threaded connection 318b. End sub 319 has a recess 321 which receives shaft sub 317a inside bushing 322. Tubular shell 318 fits over shaft reduced portion 315 and lower guide bushing 324. End sub 319 has an upper extension comprising threaded pin 325 having a longitudinal passage 326 aligned with and opening from shaft longitudinal passage 314. Tubular shell 318 has circumferentially spaced inwardly-projecting plates or ribs 327 fitting into grooves 316 in shaft 311.

Ribs 327 are shown from a front view (section line 20—20 in FIG. 18 and form two cavities within grooves 316 in which there are positioned rubber (or other elastomeric material) shock elements 328 for absorbing rotational and extension shock loads. Ribs 327 have an end wall 329 and shaft 311 has grooves 330. An annular plate cap member 331 is secured on the end of shaft 311 by the end of extension or sub 317a. An annular cavity is defined by end cap member 319 and extension sub 317a and is filled by an annular rubber compression element 335 which protects against longitudinal compression shock loads.

In use, the shock absorber 310 is connected by upper pin thread 325 to the drill pipe (not shown). The lower box thread 313 is connected to the barrel (not shown) of the percussion hammer. The weight of the drill string applies a vertical, longitudinal load, as does the vertical force applied by the drilling mechanism. Torque loads are applied by rotation of the drill pipe and bit. In the course of drilling, the drill pipe and bit are subjected occasionally to rotational shocks and occasionally to vertical shocks both in extension and in compression.

Rotational or torque shocks are absorbed by shock elements 328 which absorb forces in torque from either direction and absorb shock in extension of the tool by resisting downward extension of shaft 311 by reason of movement of ribs 327 into grooves 330 compressing the shock elements 328. Shock element 335 absorbs compression shocks by resisting movement of housing 312 downward relative to shaft 311. Guide bushings 322 and 324 guide the tool components and resist a bending moments, thus preventing knuckle-type wear. This tool therefore absorbs longitudinal, vertical shocks both in extension and compression, and rotary shocks from torque in either direction.

While this invention has been described fully and completely with special emphasis on several preferred embodiments, it should be understood that within the scope of the appended claims, the invention may be practiced otherwise than as specifically described herein.

I claim:

1. A longitudinal and rotary shock absorber for rotary and percussion drill bits comprising
   a rotary metal shaft member for connection to one component of a drilling apparatus,
   a rotary metal housing member for connection to another component of a drilling apparatus, said metal shaft member and metal housing member being assembled and secured together longitudinally for relative rotary movement and relative longitudinal movement, said metal housing member having a plurality of integral, inwardly extending metal rib members movable therewith in a rotary direction, said metal shaft member having a plurality of integral, outwardly extending metal rib members fitted between said inwardly extending rib members and movable therewith in a rotary direction, said housing member having first and second integral, radially-extending metal thrust surfaces movable therewith in a longitudinal direction, said shaft member having first and second integral, radially-extending metal thrust surfaces movable therewith in a longitudinal direction, said first housing member thrust surface being positioned at one end of said inwardly extending rib members, said first shaft member thrust surface being positioned at the other end of said inwardly extending rib members In an initial neutral position and having radially extending slots aligned with said inwardly extending rib members into which said inwardly extending rib members can move on longitudinal movement, a first resilient means comprising a plurality of separate compressible rubber or elastomeric shock absorbing pads positioned between said inwardly and outwardly extending metal rib members and between said first housing member thrust surface and said first shaft member thrust surface, for absorbing rotary shock loads by compression of at least one shock absorbing pad between said inwardly and outwardly extending metal rib members and for absorbing longitudinal extensional shock loads by compression of at least one shock absorbing pad between said first shaft member thrust surface and said first housing member thrust surface with said inwardly extending rib members moving into said shaft member radially extending slots, a second resilient means comprising a compressible rubber or elastomeric shock absorbing pad positioned between said second housing member thrust surface and said second shaft member thrust surface, for absorbing compressional shock loads by compression of said second resilient means shock absorbing pad, whereby all shock loads, in rotation, in compression, and in extension, are absorbed by compression of the respective shock absorbing pads.

2. A longitudinal and rotary shock absorber for drill bits according to claim 1 in which
said first housing member thrust surface is integral and movable with said inwardly extending rib members in both rotary and longitudinal directions.

3. A longitudinal and rotary shock absorber for drill bits according to claim 1 in which
said first shaft member thrust surface and said second housing member thrust surface are opposite sides of a single thrust member secured on and movable with said outwardly extending rib members in both rotary and longitudinal directions.

4. A longitudinal and rotary shock absorber for drill bits according to claim 1 including
longitudinally spaced bushings between said rotary shaft member and said rotary housing member guiding both longitudinal and rotary movement and resisting bending movement.

5. A longitudinal and rotary shock absorber for drill bits according to claim 1 in which
said shaft member has a box threaded portion, and said housing member has a pin threaded portion.

6. A longitudinal and rotary shock absorber for drill bits according to claim 1 in which
said shaft member and housing member have longitudinal passages for passage of fluid therethrough.

7. A longitudinal and rotary shock absorber for drill bits according to claim 1 including
said shaft member and housing member have longitudinal passages for passage of fluid therethrough,
said resilient means comprises a compressible rubber or elastomeric shock absorbing pad,
said shaft member has a box threaded portion, and said housing member has a pin threaded portion.

8. A longitudinal and rotary shock absorber for drill bits according to claim 1 in which
said housing member and said shaft member have integral members movable therewith in rotary and longitudinal directions.

9. A longitudinal and rotary shock absorber for drill bits according to claim 1 in which
said shaft member and housing member are hollow and include seals therebetween to permit flow of a drilling fluid therethrough, further including
longitudinally spaced bushings between said rotary shaft member and said rotary housing member guiding both longitudinal and rotary movement and resisting bending movement, and
said bushings, said seals and said resilient means being constructed for easy removal and replacement in the field.

* * * * *